Nov. 16, 1937.  C. W. HAAGEN  2,099,013
FERTILIZER DISTRIBUTOR
Filed Sept. 23, 1936    2 Sheets-Sheet 2

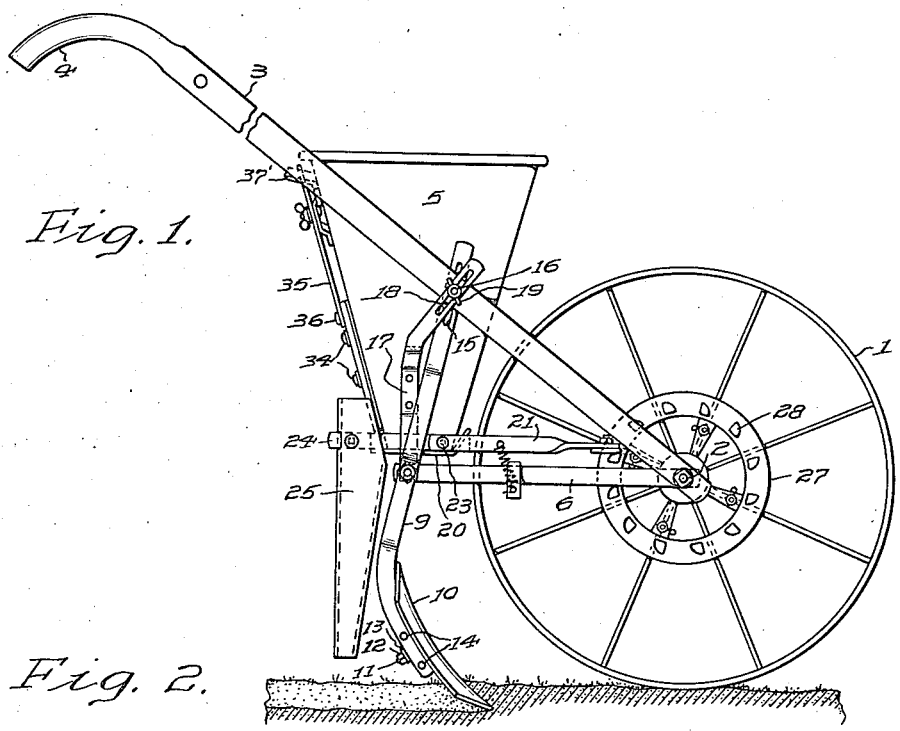

WITNESS
F. J. Hartman

INVENTOR
Charles Wellington Haagen.
BY George K. Helbert
ATTORNEY

Patented Nov. 16, 1937

2,099,013

UNITED STATES PATENT OFFICE 2,099,013

FERTILIZER DISTRIBUTOR

Charles Wellington Haagen, Philadelphia, Pa., assignor to S. L. Allen & Co., Inc., Philadelphia, Pa., a corporation of Pennsylvania Application September 23, 1936, Serial No. 102,117

6 Claims. (Cl. 111—76)

This invention relates to machines designed to deposit fertilizer in a furrow progressively formed by the machine as it is propelled over the ground, and is more particularly concerned with the mechanism by which the flow and rate of feed of the fertilizer is controlled and means for agitating it thrown into and out of operation.

A principal object of the invention, therefore is the provision in a fertilizer distributor of means operable to initiate, regulate and shut off the flow of fertilizer from the hopper as desired as well as to bring into play means for agitating the fertilizer therein whenever the machine is set to allow it to flow therefrom.

A further object of the invention is the provision in a fertilizer distributor of means for insuring an even and constant flow of fertilizer from the hopper in combination with means for adjustably controlling the rate thereof and for initiating and shutting off said flow without varying the previously determined rate of feed whereby once the mechanism has been set to distribute a predetermined amount of fertilizer per unit of distance travelled, this same rate of feed will be preserved thereafter irrespective of the number of times the flow of fertilizer is started and stopped so long as the said adjustment is maintained.

A still further object is to provide in a fertilizer distributor novel means for adjusting the angular relation of the furrow-opening tooth to the ground independently and without disturbance of other operating parts of the machine, as well as to generally improve the design and convenience of operation of fertilizer distributors intended for manual operation.

Other objects, advantages and novel features comprehended by the invention are hereafter more particularly pointed out or will be apparent from the following description of a fertilizer distributor constructed in accordance therewith and illustrated in the accompanying drawings, in which Fig. 1 is a side elevation of the machine with certain parts broken into section to better show internal construction;

Fig. 2 is a fragmentary similar side elevation thereof on an enlarged scale showing certain of the parts in a different position than Fig. 1;

Figure 3:
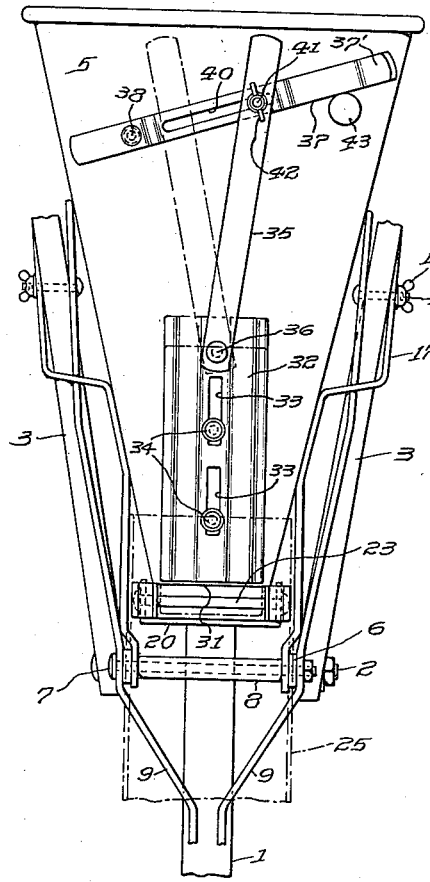
Fig. 3 is a fragmentary rear elevation of the hopper, feed mechanism and adjacent parts of the machine on the same scale as Fig. 2 showing the parts in feeding position.

As shown, the machine comprises a ground wheel 1, rotatable on an axle 2 from which a pair of handle bars 3 extend angularly rearward and upward to terminate in convenient grips 4 which are grasped by the operator of the machine as he pushes it forwardly over the ground during the process of distributing the fertilizer which is contained in a hopper 5 disposed between the handle bars behind the ground wheel. From the axle 2, a pair of laterally spaced frame bars 6 extend rearwardly in a generally horizontal direction on opposite sides of the ground wheel to terminate at a point generally below the hopper which is of frusto-pyramidal form and open at its upper and lower ends. A bolt 7 is extended transversely through the rear ends of the frame bars and provided between them with a sleeve 8 which serves to maintain them in properly transversely spaced relation. This bolt also serves as a pivot for a pair of generally vertically extending tool supporting bars 9, 9 which respectively lie against the outer faces of the frame bars and are bent inwardly toward each other below the bolt and forwardly curved at their lower extremities to provide a seat for the ground working tooth 10 removably secured to the bars by a bolt 11 fixed in the tool, projecting between them and carrying, behind the bars, a nut 12 and washer 13; as the lower ends of the bars are held together by spaced apart bolts or rivets 14 carrying spacer sleeves between the bars, capacity for substantial vertical adjustment of the tool relatively to the bars is thus afforded. The tool supporting bars also extend upwardly from the bolt 7 on each side of the hopper to a point somewhat above the handle bars, being flared outwardly so as to clear the hopper wall, and are provided near their upper ends with slots 15 through which the adjacent handle bars adjusting bolts 16 are extended.

For supporting the hopper 5 with relation to the other parts of the machine, straps 17 are secured to its opposite side walls and provided at their lower ends with forks adapted to seat over the spacer sleeve 8 while the upper ends of the straps are bent outwardly away from the hopper to a point beyond the outer faces of the handle bars and then turned upwardly and forwardly approximately on a radius struck from the axle 2 and provided with slots 18 through which the adjusting bolts project, the extremities of the latter carrying wing nuts 19 bearing against washers interposed between the straps and the nuts.

It will thus be apparent that by loosening the wing nuts 19 the angle between the tool supporting bars 9, 9 and the frame bars 6 can be varied to correspondingly vary the angle at which the tooth 10, which normally terminates below the ground wheel, enters the soil and that the making of this adjustment does not affect the angular relation between the hopper and the frame bars or other parts of the machine now to be described.

As hitherto stated, the lower end of the hopper is open and beneath it is disposed a pan 20 channel-shaped in cross section and of sufficient size to close the lower end of the hopper and extend slightly beyond its rear wall. The side flanges of the pan project upwardly outside of the side walls of the hopper and its bottom forwardly of its front wall is bent upwardly and forwardly between the flanges at an angle considerably less than that of said wall. Welded or otherwise secured to the outer face of one of the side flanges of the pan is a trip bar 21 desirably provided at its forward end with a replaceable, preferably hardened, pad 22, and the pan and bar are operatively supported for vertical oscillation on a transversely extending pivot bolt 23 passing through the side walls of the hopper adjacent its front wall. To strengthen the hopper in the vicinity of this bolt and also to form a support for the fertilizer chute hereinafter described a strap 24 is riveted or otherwise secured to each of the side walls adjacent its lower end, these straps projecting rearwardly of the hopper for a suitable distance and being slightly outwardly off-set in the rear of the pan 20, the bolt 23 of course extending through the front ends of the straps as well as the hopper walls.

On the projecting ends of the straps 24 a chute 25 is removably secured as by bolts 26. This chute is formed of sheet metal and terminates at its lower end slightly in rear and above the point of the tooth 10 so as to direct the fertilizer received from the hopper into the furrow formed by the tooth, the front wall of the chute behind the pan being cut away so as to allow the rear end of the pan to project slightly into the chute.

Attached to the spokes of the ground wheel is a wheel 27 having circumferentially spaced teeth 28 projecting from its outer face into alignment with the pad 22 on the trip bar 21, the form of these teeth being such that as the wheel rotates they will readily slide beneath the pad when the latter intersects their path to thereby raise the trip bar in opposition to a spring 29 interposed between it and the adjacent frame bar and which constantly tends to draw the former downwardly toward a stop 30 carried by the latter, the position of this stop being such that when it is engaged by the trip bar the bottom of the pan will lie against or substantially against the lower ends of the side walls of the hopper.

It will thus be apparent that when pad 22 is disposed in the path of teeth 28 and the machine is pushed forwardly over the ground the rotation of the ground wheel and toothed wheel thereby induced will cause its teeth to consecutively engage the pad and lift the trip bar away from stop 30 until the then engaged tooth passes from under the pad and allows the bar to be pulled forcibly down against the stop by the spring. It results that a vertical oscillation is imparted to the pan, the rapidity of which is of course determined by the speed with which the machine is moved ahead, and this movement of the pan tends to agitate the fertilizer in the hopper so as to break up any caking and induce a constant and substantially uniform flow through a discharge opening 31 formed by cutting away the rear wall of the hopper above the pan, from whence the fertilizer is directed by the latter into the chute and by it in turn to the furrow.

For regulating the effective area of the opening 31 so as to determine the rate at which the fertilizer can flow therethrough and also for shutting off the flow of fertilizer when desired a gate 32 is slidably positioned against the rear wall of the hopper. This gate, the width of which is such that its lower end can enter between the straps 24 and engage the bottom of the pan, is provided with vertical slots 33 through which respectively extend headed studs 34 by which it is secured to the hopper wall so it can slide vertically therealong, while to its upper end is pivotally secured a link 35 as by a rivet 36.

The link intersects near its upper end an operating lever 37 pivoted to the rear wall of the hopper by a pivot 38 carrying between its head and the lever a spring 39 which constantly forces the lever yieldingly against the hopper wall in such manner that there is considerable frictional engagement therebetween, the lower end of the lever being preferably extended for material distance beyond the pivot, with the result that its upper or operating end tends to hug the hopper wall with a relatively considerable amount of force. Between its said end and the pivot the lever is provided with a slot 40 through which and a hole in link 35 extends an adjusting bolt 41 carrying a wing nut 42 on its rear end, while a disk 43 is positioned in the path of movement of the lever to form a stop therefor effective to limit its movement either upward or downward depending on which side of the stop it is disposed. For convenience of operation the operating end 37' of the lever is turned outwardly so it may be readily grasped with the fingers.

The several parts just described are so proportioned and arranged that when the lever is raised and in engagement with the upper side of stop 43 and adjusting bolt 41 disposed at the upper end of the slot as shown in Fig. 3, the lower edge of the gate lies in substantial alignment with the upper end of the opening 31 in the rear wall of the hopper so its effective area is unrestricted, and it will be further evident that by loosening the bolt and resecuring it nearer the other end of the slot the lower edge of the gate can be made to depend over the upper edge of the said opening so as to partially or almost entirely close it, the limit position of the link and gate in this connection being indicated in broken lines in said figure. Thus by securing the adjusting bolt at any desired position in the slot the effective area of the opening 31 as determined by the adjusted position of the gate can be varied in accordance with the amount of fertilizer it is desired to feed per lineal yard of furrow.

Figure 4:
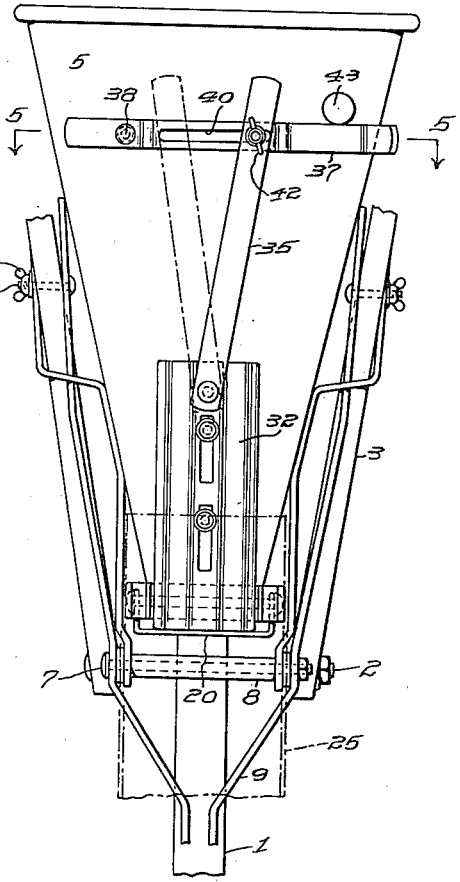
Fig. 4 is a view similar to Fig. 3 showing the parts in non-feeding position.
Figure 5:
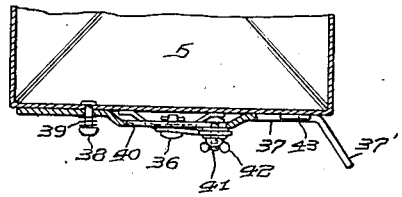
Fig. 5 is a fragmentary detail section on line 5—5 in Fig. 4.

However, irrespective of the adjusted position of the gate as determined by the location of bolt 41 in slot 40, a downward movement of the lever from the position of Fig. 3 to that of Fig. 4 is always operative to first force the lower edge of the gate into contact with pan 20 and to then move the pan downward about its pivot 23 for a sufficient distance to raise pad 22 out of the path of teeth 28 and thus after the lever clears the lower side of stop 43, to the position shown in Fig. 2, it being of course understood that the yielding connection of the lever to the hopper wall permits it to be pulled away therefrom sufficiently to pass over the stop in either direction, the lever, however, immediately tending to again hug the wall and thus lie in the plane of the stop as soon as it is released. It is therefore possible for the operator by simply throwing the lever to its lower position to entirely shut off the flow of fertilizer through opening 31 and to simultaneously interrupt the normal cooperative action between teeth 28 and pad 22, thereby placing the machine in condition to be pushed out to the field or backed up or otherwise manipulated without any movement of the trip bar and consequent oscillation of the pan. However by merely raising the lever past the stop to its uppermost position, gate 32 can be lifted so as to clear or partially clear opening 31 and allow the pan to move upwardly and the pad to descend into the path of teeth 28 so that as soon as the machine is moved forward the agitating effect of the pan will be initiated and the flow of fertilizer commenced at a rate determined by the adjusted position of the gate.

It will be noted that whenever lever 37 is moved from its lower or "shut off" position to its upper or "open" position, the gate returns to exactly the same point with relation to the opening 31 as determined by the adjusted position of bolt 41 in slot 40, and further, that irrespective of the position of the bolt the gate will travel down sufficiently whenever the lever is oppositely moved to "shut off" position to depress the pan far enough to move pad 22 out of the path of the teeth. In consequence, once the gate has been set to give a predetermined rate of feed, it will continue to do so no matter how many times the lever is operated to shut off and thereafter recommence the flow of fertilizer from the machine. This is a matter of great operating advantage since it avoids the necessity of resetting the feed control mechanism following each shutting off of the flow of fertilizer, while as above noted, the rate of feed may be readily readjusted whenever desirable by simply changing the relation of link 35 to the operating lever through the medium of the adjusting bolt.

While I have herein described one embodiment of my invention with considerable particularity, I do not thereby desire or intend to specifically limit myself thereto as various changes and modifications may be made in the design, construction and arrangement of the several parts and the invention utilized in machines designed to distribute materials other than fertilizer if desired without departing from the spirit and scope thereof as defined in the appended claims.

Having thus described my invention, I claim and desire to protect by Letters Patent of the United States:

1. The combination with a fertilizer distributor comprising a ground wheel, a hopper open at its bottom and having a discharge opening adjacent the lower end of its rear wall, a horizontally pivoted agitating pan underlying the end of the hopper, and means cooperative with the ground wheel normally operative to oscillate the pan about its pivot when the wheel is turned in a predetermined direction, of a gate slidable against the rear wall of the hopper toward and away from the pan, an operating lever pivoted to said wall for movement from one limit position to another, and a link interposed between the gate and lever and adjustable on the latter relatively to its pivot to determine the position of the lower edge of the gate with respect to the discharge opening when the lever is in one of said positions, the gate in any adjusted position of the link being adapted to depress the pan through a predetermined arc when the lever is thrown to its other limit position to thereby move the pan oscillating means out of cooperative relation with the ground wheel and to close the opening.

2. The combination with a fertilizer distributor comprising a ground wheel, a hopper open at its bottom having a discharge opening in its rear wall, a horizontally pivoted agitating pan underlying the hopper and adapted when raised to close said hopper end, a toothed wheel secured to the ground wheel, and a spring biased trip bar movable with the pan and normally extending therefrom into the path of the teeth on said wheel whereby when the wheel is turned in a predetermined direction the bar and pan are vertically oscillated, of a gate slidable on the rear wall of the hopper adapted to regulate the effective area of the discharge opening, an operating lever pivoted to said wall and movable from one limit position to another, and a link connecting the gate with the lever and adjustable therealong, said gate being adapted when said lever is thrown to one limit position to descend over said opening and depress the pan sufficiently to raise the trip bar out of the path of said teeth and when the lever is thrown to its other limit position to move out of engagement with said pan and control by its extent of overlap of said opening as determined by the adjusted position of the link on the lever the effective area for the passage of fertilizer therethrough.

3. In a fertilizer distributor the combination of a ground wheel, a hopper disposed in rear thereof open at its bottom and having a discharge opening adjacent the lower end of its rear wall, means for agitating fertilizer in the hopper comprising a pan underlying the hopper and pivoted for vertical movement, means cooperative with the ground wheel for oscillating the pan when the wheel is turned in a predetermined direction including a spring tending to swing the pan toward the hopper, and means operable to regulate the effective area of the discharge opening or to close said opening entirely and simultaneously render the pan oscillating means inoperative comprising a gate slidable on the rear wall of the hopper over the opening and into depressing engagement with the pan, and operating means therefor including a lever pivoted to said wall and a link interposed between the gate and lever and adjustable along the latter to determine the extent the gate overlaps the opening when the lever is in one position but adapted when the lever is moved to another position to move the gate past the opening sufficiently to depress the pan against the bias of the spring for a predetermined distance and thereby disengage the oscillating means from cooperative relation with the ground wheel.

4. In a fertilizer distributor comprising a hopper open at its lower end having a discharge opening in its rear wall adjacent thereto, an agitating pan pivoted for vertical oscillation beneath said end and means for oscillating the pan including a spring tending to move it toward the hopper, a gate slidable on the rear wall of the hopper over said opening, an operating lever pivoted to said wall for movement from one limit position to another, and a link connecting the lever and gate adjustable along the former to determine the extent of closure of the opening by the gate when the lever is in one of said positions and, irrespective of the adjusted position of the link on the lever, adapted to move the gate over the opening and against the pan to depress the latter through a predetermined arc in opposition to the bias of the spring when the lever is thrown to its other position.

5. In a fertilizer distributor, the combination of a ground wheel, a toothed wheel carried thereby, a furrow opening tooth disposed behind the ground wheel, a hopper open at its lower end having a discharge opening adjacent thereto in its rear wall, a chute for directing fertilizer projected through said opening downwardly into the furrow made by the tooth as the machine is pushed forward over the ground, means for agitating the fertilizer in the hopper comprising a pan pivoted thereto adapted to close the end of the hopper, a trip bar normally extending from said pan into the path of said teeth, and a spring tending to pull the bar in a direction to raise the pan toward the hopper, means for controlling the effective area of the discharge opening and operable to move the trip bar out of the path of the teeth comprising a gate slidable on and a lever pivoted to said wall, means for holding the lever in yielding frictional engagement therewith and a link pivoted to the gate and adjustable along the lever to thereby determine the extent of overlap of the lower end of the gate over said opening when the lever is in one position, movement of the lever to another position serving to force the gate against the pan and move the latter downward sufficiently to raise the trip bar out of the path of said teeth irrespective of the adjusted position of the link on the lever.

6. In a fertilizer distributor, the combination of a ground wheel, a furrow opening tooth, operating handles and a hopper open at its lower end having a discharge opening in its rear wall adjacent thereto, means for agitating the fertilizer in the hopper comprising a pan pivoted for vertical oscillation adjacent said end, a trip bar extending forwardly from the pan, a wheel carried by the ground wheel having teeth adapted to consecutively engage and raise the bar when it extends into the path thereof, a spring tending to pull the bar in a direction opposite to the movements imparted to it by the teeth and a stop disposed to limit the movement imparted to it by the spring, and means for controlling the effective area of the discharge opening or for holding the bar out of the path of said teeth to arrest the oscillation of the pan comprising a gate slidable on the rear wall of the hopper and movable over said opening, an operating lever pivoted to and yieldingly pressed against said wall, a link extending from the gate to the lever and adjustable therealong, and a stop carried by the wall adapted to limit the movement of the lever in opposite directions, whereby when the lever is in the uppermost of its limit positions the lower end of the gate is raised from the pan and disposed with respect to said opening in accordance with the adjusted position of the link on the lever and when the latter is in the lowermost of its limit positions the lower edge of the gate is in engagement with the pan and the latter thereby depressed sufficiently to move the trip bar out of the path of said teeth.

CHARLES WELLINGTON HAAGEN.